Oct. 19, 1965   J. I. EDWINS   3,212,791
FRAME FOR TWO WHEEL VEHICLE
Filed Sept. 23, 1963   2 Sheets-Sheet 1
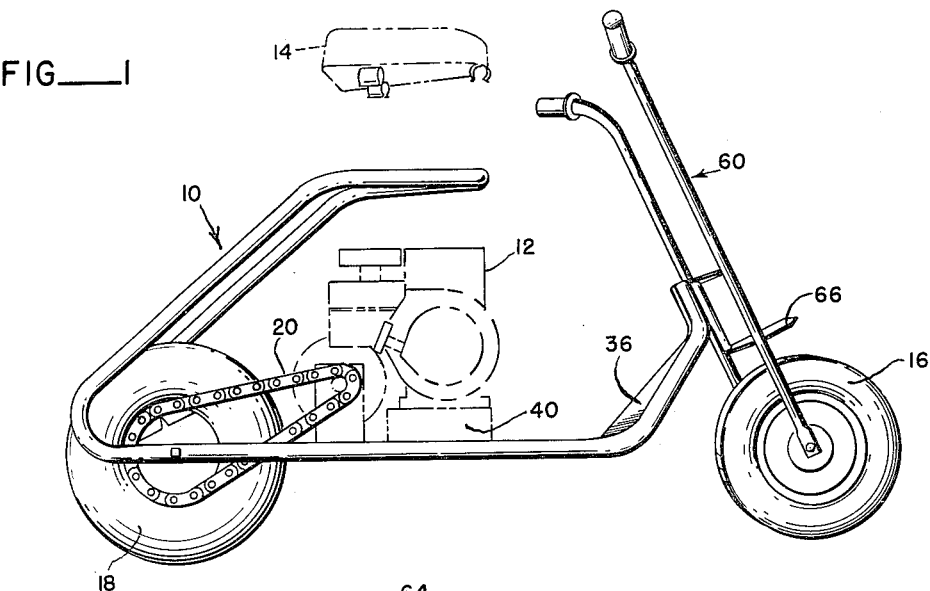
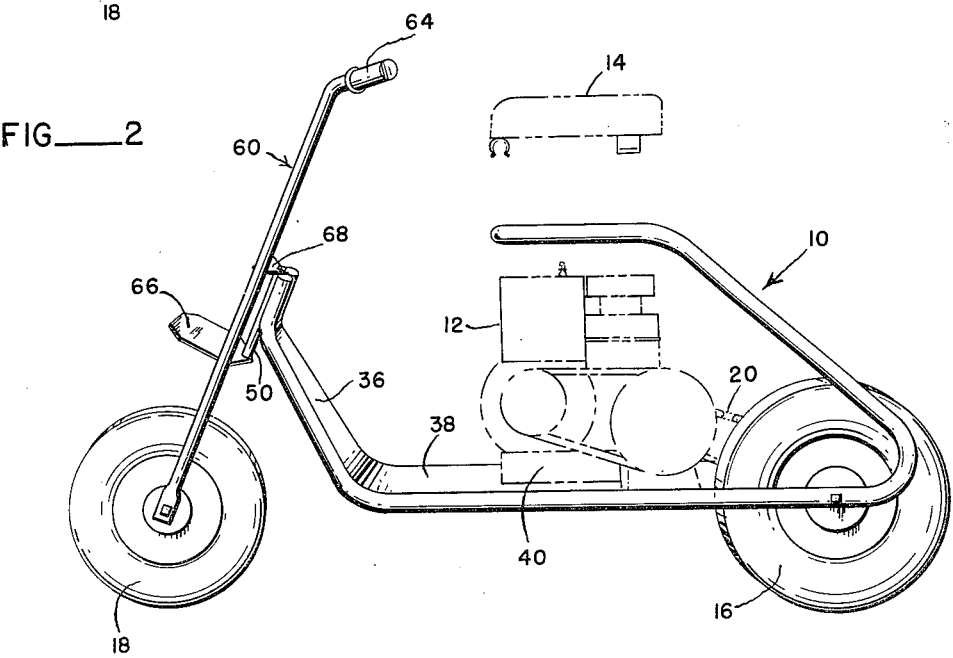
JAMES I. EDWINS
*INVENTOR.*
BY *Tuck & Cole*
ATTORNEYS Oct. 19, 1965  J. I. EDWINS  3,212,791
FRAME FOR TWO WHEEL VEHICLE
Filed Sept. 23, 1963  2 Sheets-Sheet 2
FIG__3
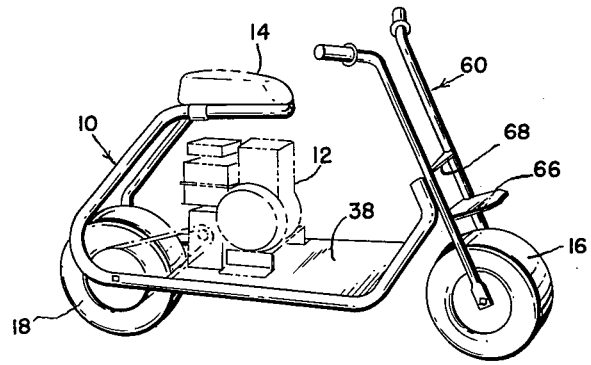
FIG__4
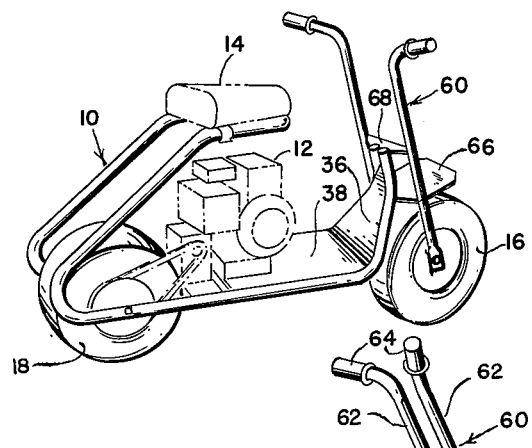
FIG__5
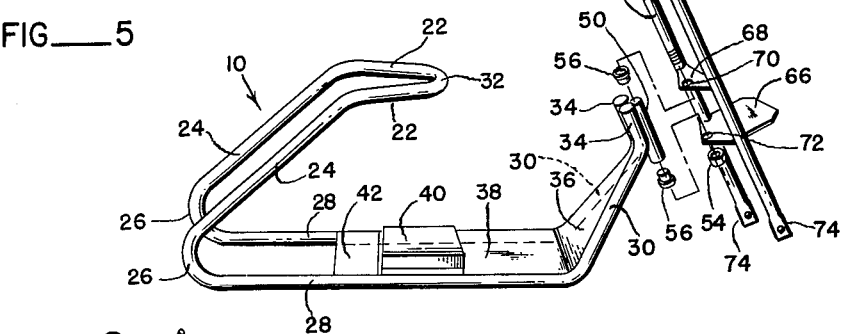
FIG__6
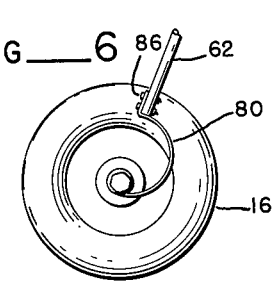
FIG__7
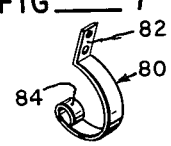
JAMES I. EDWINS
INVENTOR.
BY Tuck & Cole
ATTORNEYS

United States Patent Office 3,212,791
Patented Oct. 19, 1965

3,212,791
FRAME FOR TWO WHEEL VEHICLE
James I. Edwins, % J. L. Edwins Co., Inc., Rte. 1,
Box 1242, Issaquah, Wash.
Filed Sept. 23, 1963, Ser. No. 310,697
8 Claims. (Cl. 280—275)

This invention relates to a frame structure for a two wheel type motor scooter and more particularly to a frame for a two wheel type motorized vehicle which is made of a single piece of material and which because of its design is not only strong but resilient.

In recent years motor scooter type vehicles have been developed to the point where they are used extensively for off-highway and off-road purposes. These vehicles are so constructed that they can be used in extremely rugged terrain. Thus, there are among the numerous uses to which they may be put, such as hunting and fishing in rugged, mountainous or wooded terrain, ranch and beach uses, and camping trips. These vehicles are intended to travel where cars cannot travel and to traverse terrain that would ordinarily be accessible only on foot. In general all of the hitherto known vehicles which are designed for trail-type use employ a rigid frame structure. As a result the user or operator finds himself subject to all of the shocks, impacts, and bumps which the vehicle encounters.

A feature of the present invention which is a singular factor in its success is a one piece resilient type frame structure. This frame not only contains the high strength required for this type of scooter but also is resilient enough to absorb many of the shocks, impacts, and bumps of off-highway trail type terrain.

In effect, the frame of this invention is a specially formed length of high quality tubular steel in which the frame design and configuration take advantage of the natural springiness of the steel tubing. At the same time the frame is designed so as to avoid any concentrated stress points.

Another feature of this invention is a frame which, because of its one-piece nature, avoids the inherent disadvantages of numerous welded components. Since the frame is a single piece unit and because it does avoid welds in the basic frame structure, it is necessarily easy to produce and comparatively inexpensive.

Other features and advantages of this frame structure will become apparent in the following details of its construction. The drawings, which form part of this disclosure and in which like numerals will refer to like parts throughout, are to be read in conjunction with the following detailed discussion.

In the drawings:

FIGURE 1 is a side view of the vehicle frame shown in perspective;

FIGURE 2 is a perspective view taken from the opposite side of the vehicle from FIGURE 1;

FIGURE 3 is a view in perspective in which the vehicle frame is viewed from the side and to the front;

FIGURE 4 is a view in perspective viewing the vehicle frame from the rear side;

FIGURE 5 is a view in perspective and in which the vehicle has been dismantled and the parts of the frame exploded in order to more acurately show the details thereof;

FIGURE 6 is a partial side view of an alternative form for mounting the front wheel on the front fork unit; and FIGURE 7 is a perspective view of the spring type mounting shown in FIGURE 6.

Referring now to the drawings it will be seen that the machine or vehicle itself has a main supporting frame 10 and a front steering frame structure shown generally by number 60. Motor 12 is supported on the lower run of the main supporting frame as are front wheel 16, rear wheel 18 and drive chain 20 interconnected between the rear wheel and the gear box, which is associated with the motor. Motor 12 has been illustrated only in outline form for clarity of presentation and because the details thereof are not essential to an understanding of the invention. Seat 14 can be seen to be raised above the frame in some views in order to leave the pictorial representation of the invention as uncluttered as possible. In like manner control cables and details of the rear wheel mounting and braking structure are also eliminated for the sake of clarity.

The frame structure itself, best shown in FIGURE 5, is, as mentioned above, formed from a single piece of high quality alloy tubular steel. It is possible that new plastic types of tubing such as reinforced fiber glass could be used, though steel is considered preferable. The frame 10 is configurated so that it is in effect a doubled support in which the two sides of the frame are formed identically but spaced apart in substantially parallel relationship through the greater portion of the structure for reasons which will become apparent hereinafter. The two ends of the single piece of tubing are brought together and secured as by welds or bolts or in any other suitable manner to form similar side-by-side upper spindle sections 34. The upper spindle sections 34 of the frame are short in length and can be seen to slope or angle forwardly and downwardly to accommodate the front fork structure 60, which will be covered in greater detail in subsequent discussion.

At the bottom end of the upper spindle sections 34 the frame 10 diverges, extending downwardly, rearwardly and outwardly to approximately a distance of twelve inches apart at the lower end thereof. Thus, there is formed the generally inverted V made up of lower spindle sections 30. The diverging sides of the frame are then bent to extend to the rear in generally, horizontal parallel, spaced-apart relationship resulting in the lower or main support portions 28. The lower or main support portions 28 of the frame structure must be long enough to provide a foot rest area, room for the motor mounting structure and space for the rear wheel. At the rear end of each of the main frame support portions 28 the two sides of the frame are bent upwardly, as at 26, so that the frame generally doubles back over itself. Note that the radius of bends 26 is relatively large so as to avoid undue stress. The upper support sections 24 extend generally forwardly and upwardly from bends 26, as seen in all the views of the frame. Finally, the upper ends of the upper support sections 24 are bent to form the generally horizontal and converging seat frame sections 22. In this way the single piece of frame material is bent as at 32 so as to maintain the integral one-piece frame structure. It will be noted that the closed or bent end 32 of the frame is located roughly over the center of the lower or main supporting portions 28.

The area between the diverging frame members 30 is covered by toe sheet 36 and the approximate forwardmost one-third of the space between the main support frame portions 28 is covered by footrest or platform sheet portion 38. Immediately to the rear of footrest portion 38 is the raised motor mounting platform 40 and immediately to the rear of raised platform 40 is another flat, somewhat narrower, gear box supporting platform 42. It will be seen that slightly more than a third of the rear area between said frame support sections 28 remains unobstructed by any sort of support structure. It will be noted that the raised motor mounting 40 is generally under seat portions 22 of the frame 10. Attached to the front side of the two frame sections 34 will be found a fork spindle means 50 and inserted into each end, that is both the lower and the upper ends of the fork spindle 50, are the bushings 56.

The front fork unit 60 is essentially two elongated generally straight tubular forks 62. The upper end of the forks are bent generally outwardly and slightly to the rear to be provided with the control handles 64. The lower ends of forks 62 terminate with flattened lower ends 74 through which holes are drilled to receive the axle for the front wheel 16. The spaced apart fork members 62 are interconnected by a fender means 66, which is in effect a flat piece of heavy sheet material which is securely attached by welds or bolts at the rear outside corners thereof so that it extends forwardly and slightly upwardly to be in spaced relation above the top of front wheel 16. Said fender means 66 is provided at the rear thereof generally midway between the two fork units 62 with hole 72. Spaced above fender 66 is a second interconnecting member 68 which does not extend forwardly as much as fender 66. Interconnecting member 68 is also provided with a hole means 70. The two interconnecting members 66 and 68 are spaced apart so that the fork spindle 60 can be received therebetween and so that it may be aligned with holes 70 and 72.

The front fork unit 60 and the main frame 10 are joined by bringing the holes 70 and 72 of the fork interconnectors 66 and 68 into alignment at the upper and lower ends of fork spindle 50. The fork spindle bolt 52 is then inserted through hole 70, through top bushing 56, through fork spindle 50, out of the lower bushing 56, through hole 72, and secured by nut 54. In this way a front wheel supporting fork is provided and a turnable handle means is achieved for steering the assembled vehicle.

FIGURES 6 and 7 show an alternative mounting 80 for the front wheel 16. Each of the forks 62 is shortened and receives on the lower end thereof the half circular spring 80. Each spring 80 has an upper attachment section 82 and its lower end is reverse formed to present axle loops 84. The attachment section 82 is secured to fork 62 with bolts 86. This front wheel spring mounting further enhances the riding characteristics of the frame. Obviously other types of spring structures, such as coiled types, could be incorporated.

The nature of the frame structure just described is to make a substantial contribution to smoother riding characteristics for a vehicle which is especially designed for rough, bumpy terrain. The seat section is resilient and will move up and down as shocks and impacts are encountered. Likewise, the lower part of the frame will also move resiliently in a generally up and down direction around the bend 26 of the frame. It will be understood that springiness derives from both the main support and seat portions of the frame and yet it has been found that the frame retains its strength and makes a significant contribution to the operator's comfort.

The foregoing is considered as illustrative only of the principle of this invention. Since modifications will occur to those skilled in the art it is not desired to limit the invention to the exact construction shown and described. Accordingly, all suitable equivalents may be resorted to, falling within the scope of the invention.

What is claimed is:

1. A resilient, shock and impact absorbing frame structure for a two wheel vehicle, comprising: (a) a main frame unit formed of a single piece of tubing in which the ends of said tubing are substantially joined to form a pair of essentially abutting upper spindle sections, a pair of diverging lower spindle sections joined to said upper spindle sections, a pair of spaced-apart generally parallel horizontal main support portions joined to and extending rearwardly from said lower spindle sections, a pair of spaced-apart generally parallel upper support sections joined to and reverse formed generally over the rear half of said main support portions, and a pair of converging seat support sections joined to said upper support sections and integrally joined and formed from the center part of said single piece of tubing, and (b) a front fork unit composed of two spaced-apart, generally parallel fork legs interconnected by upper and lower connecting frame members, the upper ends of said fork legs forming handle bar means and the lower ends forming front axle support means, and pivot spindle means joined to said upper spindle sections and adapted to be pivotally received between said connecting frame members.

2. The frame structure according to claim 1 and in which the lower end of each of said fork legs is provided with a curved resilient spring element having an upper bracket means for attachment to said fork leg and a lower front axle support loop means.

3. A resilient, shok and impact absorbing frame structure for a two wheel vehicle, comprising: (a) a single length of metal tubing forming a main frame unit in which the two ends of said single length of tubing are joined to define a pair of generally abutting upper spindle sections, a pair of diverging lower spindle sections joined to and extending generally downwardly and rearwardly from said upper spindle sections, a pair of spaced-apart generally parallel horizontal main support portions joined to said lower spindle sections, a pair of spaced-apart generally parallel upper support sections joined to and extending from bends at the rear ends of said main support portions generally upwardly and forwardly to a point generally above the center area of said main support portions, and a pair of converging generally horizontal seat support sections joined to said upper support sections and integrally joined and formed from said single length of tubing, and (b) a front fork means composed of two spaced-apart generally parallel fork legs interconnected by upper and lower connecting frame members, the upper ends of said fork legs forming handle bar means and the lower ends forming front axle supporting means, and pivot spindle means joined to said upper spindle sections and adapted to be pivotally received between said connecting frame members.

4. The frame structure according to claim 3 and in which the lower end of each of said fork legs is provided with a curved resilient spring element having an upper bracket means for attachment to said fork leg and a lower front axle support loop means.

5. A resilient, shock and impact absorbing frame structure, comprising: (a) a single length of tubing forming a main frame unit in which the two ends of said single length of tubing are brought closely together to define a pair of generally abutting short upper spindle sections, a pair of diverging lower spindle sections joined to and extending generally downwardly and rearwardly from said upper spindle sections, a pair of spaced-apart generally parallel horizontal main support sections joined to said lower spindle sections, a pair of spaced-apart generally parallel upper support sections joined to and extending from bends at the rear ends of said main support portions generally upwardly and forwardly to a point generally above the center area of said main support portions, and a pair of converging generally horizontal seat support sections joined to said upper support sections and integrally joined and formed from the middle part of said single length of tubing, and (b) a front fork unit means composed of two generally spaced-apart parallel fork legs interconnected by upper and lower connecting frame members, the upper ends of said fork legs forming handle bar means and the lower ends forming front axle supporting means, and pivot spindle means joined to said upper spindle sections and adapted to be pivotally connected between said connecting frame members.

6. The frame according to the structure of claim 5 and in which the lower end of each of said fork legs is provided with a curved resilient spring element having an upper bracket means for attachment to said fork leg and a lower front axle support loop means.

7. A resilient, shock and impact absorbing frame structure, comprising: (a) a single length of metal tubing forming a main frame unit in which the two ends of said single length of tubing are joined to define a pair of upper spindle sections, a pair of lower spindle sections joined to and extending generally downwardly and rearwardly from said upper spindle sections, a pair of generally horizontal main support section joined to said lower spindle sections, a pair of upper support sections joined to and extending from bends at the rear ends of said main support portions generaly upwardly and forwardly to a point generally above the center area of said main support portions, and a generally horizontal seat support section joined to said upper support sections and formed from the middle part of said single length of tubing, and (b) a front fork unit means composed of two generally parallel fork legs interconnected by upper and lower connecting frame members, the upper ends of said fork legs forming handle means and the lower ends forming front axle supporting means, and pivot spindle means joined to said upper spindle sections and adapted to be pivotally received between said connecting frame members for pivotally securing said front fork unit to said main frame unit.

8. The frame according to the structure of claim 7 and in which the lower end of each of said fork legs is provided with a resilient spring element having an upper attachment means for being secured to said leg and a lower front axle support means.

References Cited by the Examiner

UNITED STATES PATENTS

| 908,993 | 1/09 | Huber | 280—286 |
| 2,279,874 | 4/42 | Rockola | 180—30 |
| 2,768,836 | 10/56 | Hilber | 280—276 |
| 2,817,406 | 12/57 | Brewer | 280—281 X |

FOREIGN PATENTS 922,991   1/55   Germany.

MILTON BUCHLER, *Primary Examiner.*

KENNETH H. BETTS, *Examiner.*